US012286081B2

(12) United States Patent
Taniguchi et al.

(10) Patent No.: US 12,286,081 B2
(45) Date of Patent: *Apr. 29, 2025

(54) VEHICLE CENTER CONSOLE

(71) Applicant: HONDA MOTOR CO., LTD., Tokyo (JP)

(72) Inventors: Hiroyasu Taniguchi, Tokyo (JP); Ryosuke Matsuoka, Tokyo (JP); Toshinori Tsukagoshi, Wako (JP); Hiroyuki Yamamoto, Wako (JP); Michihiro Hoshijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

This patent is subject to a terminal disclaimer.

(21) Appl. No.: 17/970,636

(22) Filed: Oct. 21, 2022

(65) Prior Publication Data

US 2023/0144981 A1 May 11, 2023

(30) Foreign Application Priority Data

Nov. 8, 2021 (JP) .................................. 2021-181887

(51) Int. Cl.
*B60R 7/04* (2006.01)
*B60R 11/00* (2006.01)

(52) U.S. Cl.
CPC .......... *B60R 7/04* (2013.01); *B60R 2011/0007* (2013.01)

(58) Field of Classification Search
CPC ............... B60R 7/04; B60R 2011/0007; B60R 2011/0241

(Continued)

(56) References Cited

U.S. PATENT DOCUMENTS 4,690,448 A 9/1987 Fujisawa
5,823,599 A * 10/1998 Gray .......................... B60R 7/04
224/929

(Continued)

FOREIGN PATENT DOCUMENTS

CN 104885031 9/2015
JP 2010-036818 2/2010

(Continued)

OTHER PUBLICATIONS

Japanese Office Action for Japanese Patent Application No. 2021-181887 mailed Sep. 12, 2023.

(Continued)

*Primary Examiner* — Gregory A Blankenship
(74) *Attorney, Agent, or Firm* — Amin, Turocy & Watson, LLP (57) ABSTRACT

A center console includes an article placement portion, a front block portion, a rear block portion, a bridge portion, an inclination wall, and a terminal connection port. The front block portion is arranged at a forward position of the article placement portion. The rear block portion is arranged at a rearward position of the article placement portion. The bridge portion is provided on the front block portion and the rear block portion. The bridge portion is arranged above the article placement portion to interpose a space portion and has a width in a vehicle width direction which is narrower than that of the article placement portion. The inclination wall is arranged on a front section of the article placement portion and is inclined to a vehicle forward side toward an upward direction. The terminal connection port is arranged on the inclination wall. The terminal connection port is arranged at a position that does not overlap the bridge portion in a top view.

7 Claims, 5 Drawing Sheets

(58) Field of Classification Search
USPC .............................................. 296/24.34, 37.8
See application file for complete search history.

(56) References Cited

U.S. PATENT DOCUMENTS

| | | | |
|---|---|---|---|
| D533,492 S * | 12/2006 | Maezono | D12/192 |
| D718,200 S * | 11/2014 | Arnaout | D12/192 |
| D727,816 S * | 4/2015 | Takagi | D12/192 |
| 9,199,581 B2 * | 12/2015 | Ishibashi | B60R 7/06 |
| D958,716 S * | 7/2022 | Benjamin | D12/192 |
| D972,998 S * | 12/2022 | Carr | D12/195 |
| 2007/0024075 A1 * | 2/2007 | Nakamura | B60R 7/04 |
| | | | 224/539 |
| 2011/0062739 A1 * | 3/2011 | Kuhlmann | B60R 11/00 |
| | | | 296/70 |
| 2014/0265420 A1 * | 9/2014 | Myers | B60R 7/06 |
| | | | 296/70 |
| 2014/0292015 A1 | 10/2014 | Lambert et al. | |
| 2015/0069776 A1 | 3/2015 | Ishibashi et al. | |
| 2017/0190295 A1 * | 7/2017 | Ogawa | B60R 7/04 |
| 2018/0194304 A1 * | 7/2018 | Hupman | B60R 11/02 |
| 2021/0188140 A1 | 6/2021 | Mizobata et al. | |
| 2023/0144981 A1 * | 5/2023 | Taniguchi | B60R 7/04 |
| | | | 296/24.34 |
| 2023/0146107 A1 * | 5/2023 | Taniguchi | B60R 7/04 |
| | | | 296/24.34 |
| 2023/0304339 A1 * | 9/2023 | Kim | E05D 11/06 |

FOREIGN PATENT DOCUMENTS

| | | |
|---|---|---|
| JP | 2013-220740 | 10/2013 |
| JP | 2014-133503 | 7/2014 |
| JP | 2014-133509 | 7/2014 |
| JP | 2014-213632 | 11/2014 |
| JP | 2018-075875 | 5/2018 |
| JP | 2019-043433 | 3/2019 |
| JP | 2020-040497 | 3/2020 |
| JP | 2021-102356 | 7/2021 |
| JP | 2022-054361 | 4/2022 |

OTHER PUBLICATIONS

Japanese Office Action for Japanese Patent Application No. 2021-181892 mailed Sep. 12, 2023.
Non-Final Office Action for U.S. Appl. No. 17/971,676 dated Dec. 6, 2024.

\* cited by examiner

VEHICLE CENTER CONSOLE

CROSS-REFERENCE TO RELATED APPLICATION

Priority is claimed on Japanese Patent Application No. 2021-181887, filed on Nov. 8, 2021, the contents of which are incorporated herein by reference.

BACKGROUND

Field of the Invention

The present invention relates to a vehicle center console.

Background

As a structure inside a vehicle room of a vehicle, such a structure is known in which a center console on which a shift operation portion, a variety of switches, an article storage portion, and the like are arranged is provided between a driver seat and a passenger seat of a front seat.

In recent years, in accordance with the popularization of a portable information terminal and the like, a vehicle in which a terminal connection port such as a USB port is provided in a vehicle room in the vehicle is increased. In consideration of the convenience for an occupant in the front seat, a structure inside a vehicle room is proposed in which an article placement portion on which an article such as the portable information terminal is placeable and the terminal connection port such as a USB port are arranged on an upper portion of the center console (for example, refer to Japanese Unexamined Patent Application, First Publication No. 2013-220740).

SUMMARY

However, in the above-described center console of the related art, since the article placement portion and the terminal connection port are arranged on the upper portion of the center console, when a liquid such as a drink is accidentally spilled on the upper portion of the center console in a state where an article such as a portable information terminal is placed on the article placement portion, the liquid may be slopped on the article. Further, in the center console of the related art, the terminal connection port is arranged at a high position on an upper surface side of the center console, and therefore, an occupant seated in the front seat does not easily perform a work by which an electrical device such as a portable information terminal is attached to or detached from the terminal connection port.

An aspect of the present invention provides a vehicle center console which is capable of protecting an article that is placed on an article placement portion and in which a terminal of an electrical device is capable of being easily attached to and detached from a terminal connection port.

A vehicle center console according to an aspect of the present invention includes: an article placement portion; a front block portion that is arranged at a forward position of the article placement portion; a rear block portion that is arranged at a rearward position of the article placement portion; a bridge portion that is provided on the front block portion and the rear block portion, is arranged above the article placement portion to interpose a space portion, and has a width in a vehicle width direction which is narrower than that of the article placement portion; an inclination wall that is arranged on a front section of the article placement portion and is inclined to a vehicle forward side toward an upward direction; and a terminal connection port that is arranged on the inclination wall, wherein the terminal connection port is arranged at a position that does not overlap the bridge portion in a top view.

According to the configuration described above, a main section above the article placement portion is covered by the bridge portion. Therefore, even if an occupant accidentally spills a liquid such as a drink at the upper side of the center console, the liquid such as the drink is unlikely to be slopped on an article that is placed on the article placement portion. Further, the terminal connection port is arranged on the inclination wall at the front section of the article placement portion and is located at a position that does not overlap the bridge portion in the top view. Therefore, together with the narrower width of the bridge portion than the width of the article placement portion, it is possible to easily attach and detach an electrical device with respect to the terminal connection port.

The inclination wall may be inclined in a vehicle width direction toward a direction of an occupant seated in a front seat.

In this case, it becomes possible to easily attach and detach an electrical device with respect to the terminal connection port while the occupant seated in the front seat remains in a seated state.

An eave section that extends above the terminal connection port may be provided on the front block portion.

In this case, since the eave section of the front block portion covers an upper portion of the terminal connection port, when a liquid such as a drink is spilled at the upper portion of the center console, it is possible to prevent the spilled liquid from being directly slopped on the terminal connection port by the eave section.

An article storage recess section that opens upward may be provided on the rear block portion, and a penetration groove which opens to an upward side and through which a cable that connects the terminal connection port to an electrical device is capable of being inserted may be provided on a circumferential wall of the article storage recess section.

In this case, by inserting the cable of which one end portion is connected to the terminal connection port through the penetration groove, an electrical device that is connected to the other end portion of the cable can be arranged in the article storage recess section of the rear block portion. Accordingly, since the placement position of the electrical device can be selected from the article placement portion and the article storage recess section and be determined, the convenience for the occupant is further enhanced.

The penetration groove may be provided on both right and left sides of a front wall of the article storage recess section.

In this case, by inserting the cable from a front direction (article placement portion side) into one penetration groove of the front wall, arranging the cable that is drawn into the article storage recess section in a width direction at a rear surface side of the front wall, and inserting the cable into the other penetration groove, the cable can be drawn to a forward side of the front wall. Further, if necessary, by arranging the cable that is drawn to the forward side of the front wall in the width direction at a front surface side of the front wall and inserting the cable into the one penetration groove again, the cable can be drawn into the article storage recess section. Similarly, the cable can also be wound on a circumferential wall arbitrary number of times in accordance with the length of the cable to be used. Accordingly, in a case where the present configuration is employed, when the length of the cable to be used is long, an extra length portion of the cable can be held between the right and left penetration grooves of the front wall of the article storage recess section, and the convenience for the user is enhanced.

A lid body that is openable and closable and that closes an upper part of the article storage recess section may be provided on the rear block portion, and the lid body may open an upper part of the penetration groove in an open state, and may cover the upper part of the penetration groove and maintain communication in a forward-rearward direction of the front wall in a closed state.

In this case, an electrical device can be stored in the article storage recess section while maintaining a state where the electrical device and the terminal connection port are connected by a cable, and the lid body can be closed while maintaining the state. Therefore, the electrical device can be stored in the storage recess section in a state where the electrical device cannot be seen from the outside and charging of the electrical device or the like can be performed in the state. Accordingly, in a case where the present configuration is used, the electrical device can be further safely arranged inside the vehicle.

In the vehicle center console according to an aspect of the present invention, the bridge portion having a width in the vehicle width direction which is narrower than that of the article placement portion is arranged above the article placement portion to interpose the space portion, and the terminal connection port is arranged on the inclination wall at the front section of the article placement portion so as not to overlap the bridge portion in a top view. Therefore, when the center console according to an aspect of the present invention is employed, it is possible to protect an article that is placed on the article placement portion by the bridge portion, and an occupant seated in the front seat can easily attach and detach the terminal of an electrical device with respect to the terminal connection port.

DESCRIPTION OF EMBODIMENTS

Hereinafter, an embodiment of the present invention will be described with reference to the drawings.

Forward, rearward, upward, downward, rightward, and leftward directions in the following description mean forward, rearward, upward, downward, rightward, and leftward directions with respect to a vehicle unless otherwise specified. In appropriate positions in the drawings, an arrow UP that indicates a vehicle upward direction, an arrow FR that indicates a vehicle forward direction, and an arrow LH that indicates a vehicle leftward direction are shown.

Figure 1:
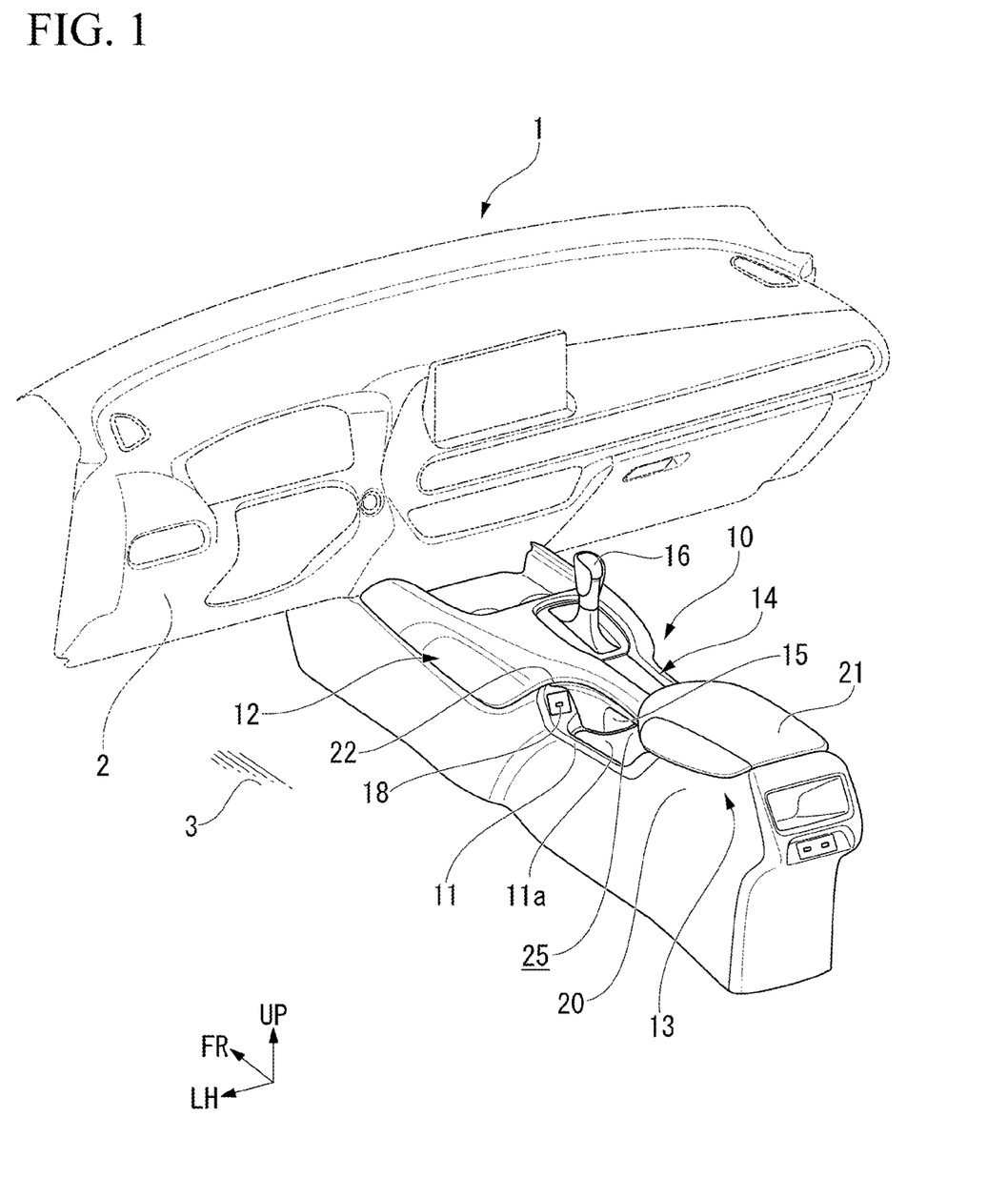
FIG. 1 is a perspective view of a vehicle room front portion of a vehicle according to an embodiment.

FIG. 1 is a perspective view showing a front portion of a front seat inside a vehicle room of a vehicle 1 according to an embodiment.

As shown in FIG. 1, an instrument panel 2 on which a variety of instruments, an audio operation portion, an air conditioner operation portion, and the like are installed is arranged at the front of the front seat inside the vehicle room. The vehicle 1 of the present embodiment is a so-called left-hand drive vehicle in which a driver seat is arranged on a left side toward a vehicle forward side, and a passenger seat is arranged on a right side. A center console 10 is arranged between the driver seat and the passenger seat. The center console 10 projects upward with respect to a floor 3 inside the vehicle room, and a front end portion extends to a lower region of the instrument panel 2. The center console 10 is formed in a substantially rectangular shape in which the entire center console 10 is elongated in a forward-rearward direction.

Figure 2:
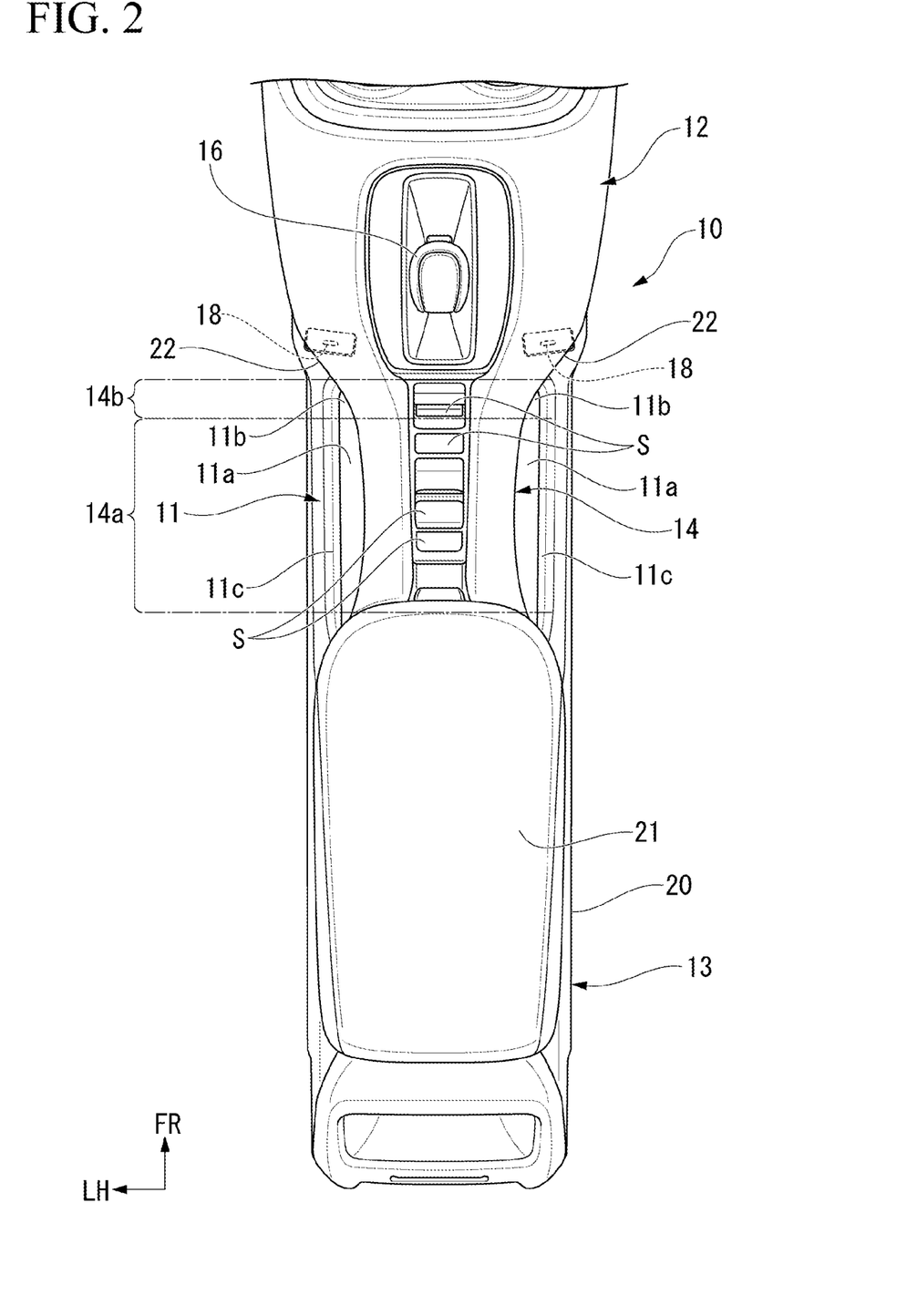
FIG. 2 is a plan view of a center console according to the embodiment.
Figure 3:
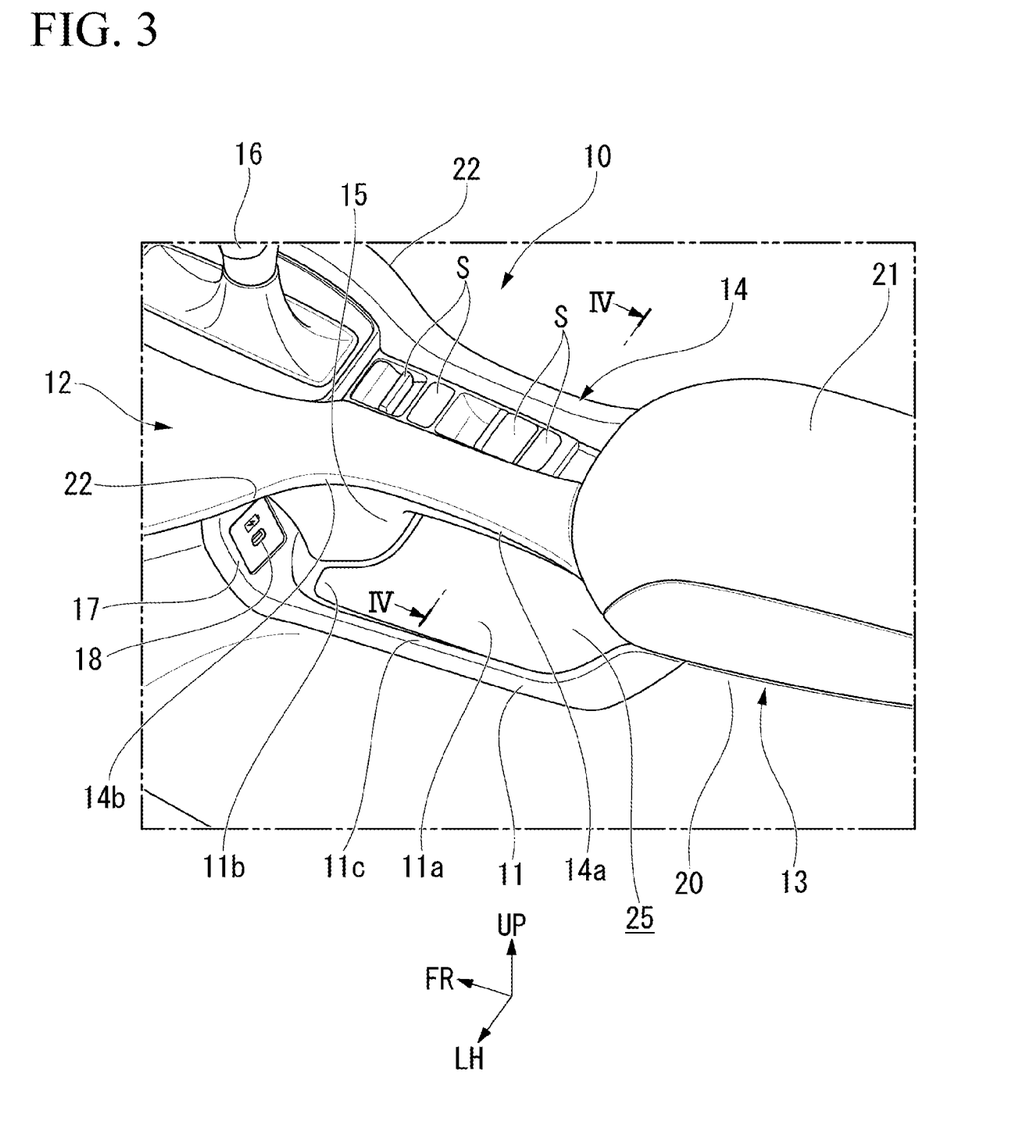
FIG. 3 is a perspective view of the center console according to the embodiment.

FIG. 2 is a plan view of the center console 10. FIG. 3 is a perspective view of the center console 10 seen from a rear left upper direction.

The center console 10 includes: an article placement portion 11 having a flat placement surface 11a on an upper surface of the article placement portion 11; a front block portion 12 that is arranged at a forward position of the article placement portion 11; a rear block portion 13 that is arranged at a rearward position of the article placement portion 11; and a bridge portion 14 that is provided on the front block portion 12 and the rear block portion 13.

The article placement portion 11 includes: a placement surface 11a that extends substantially horizontally and has a substantially rectangular shape in a top view; an extension placement surface 11b that extends forward substantially horizontally from right and left side end portions of the placement surface 11a; and a side wall 11c that stands upward from an outer end portion in a vehicle width direction of the placement surface 11a and the extension placement surface 11b. The article placement portion 11 is formed in a tray shape having an edge on both right and left sides. A rearward projection portion 15 that stands upward is arranged in a middle region in the vehicle width direction of a front portion of the placement surface 11a. The rearward projection portion 15 constitutes part of a rear wall of the front block portion 12. The rearward projection portion 15 projects in a protrusion shape to a vehicle rearward side in the middle region in the vehicle width direction of the front portion of the placement surface 11a. Right and left extension placement surfaces 11b are a forward extension region of the placement surface 11a that is divided in a rightward-leftward direction by the rearward projection portion 15.

When an article having a rectangular plate shape such as a portable information terminal is placed on the placement surface 11a, the rearward projection portion 15 can regulate a forward displacement of the article by coming into contact with a front end portion of the article. Further, when the article having a rectangular plate shape is placed on the placement surface 11a, it is possible to ensure a space by the extension placement surface 11b in front of a front end portion close to the outside in the width direction of the article. When the article having a rectangular plate shape is removed from the placement surface 11a, a user can insert his/her finger into the space by the extension placement surface 11b and easily remove the article by placing his/her finger on a front end portion of the article.

The front block portion 12 is a block in which a shift lever 16 is arranged on an upper surface of the front block portion 12, and a lever interlock device, a wiring, and the like are embedded inside the block portion 12. A front end section of the front block portion 12 is connected to a lower portion in a middle region in the vehicle width direction of the instrument panel 2. The rearward projection portion 15 described above is provided in a middle region in the vehicle width direction of a rear section of the front block portion 12. An inclination wall 17 that is inclined to a vehicle forward side toward an upward direction is formed on each of both right and left sides of the rear rearward projection portion 15 at the rear section of the front block portion 12. Each inclination wall 17 is arranged at a forward position of each of right and left extension placement surfaces 11b of the article placement portion 11 and is also inclined in the vehicle width direction toward a direction of an occupant seated in the front seat (the driver seat or the passenger seat) (so as to substantially face the seated occupant).

A terminal connection port 18 to which an electrical device such a portable information terminal (including a mobile phone) is connected is provided on each of right and left inclination walls 17. The terminal connection port 18 is a connection port such as a USB port to which a terminal for performing electric power supply, transmission and reception of a signal, or the like with the electrical device is connected; however, the shape or the structure of the terminal connection port 18 is arbitrary. The number of terminal connection ports 18 provided on the inclination wall 17 may be two or more. In this case, the terminal connection ports 18 may be ports of the same form (the same standard) or may be ports of a different form (different standard).

A terminal of a cable 19 (refer to FIG. 5) connected to the electrical device can be connected to each terminal connection port 18. A terminal provided to protrude on a device can also be inserted directly to each terminal connection port 18 if the device is a flash memory or the like.

An eave section 22 that extends toward a vehicle rearward side and covers an upper portion of the terminal connection port 18 is provided to extend on an upper end portion of each of right and left inclination walls 17.

The rear block portion 13 includes an article storage recess section 20 that opens upward and a lid body 21 that opens and closes an opening 20a (refer to FIG. 5) of the article storage recess section 20. An opening/closing hinge (not shown) is provided on a rear end side of the lid body 21, and the lid body 21 is operated (rotated) around a hinge axis of the opening/closing hinge by an operation of an occupant. When the opening 20a of the article storage recess section 20 is opened, a front end side of the lid body 21 is greatly lifted upward around a rear end side of the lid body 21. Further, a cushion material is embedded in an upper surface side and a circumferential region of the lid body 21. The lid body 21 also functions as an arm rest on which an occupant seated in the front seat places his/her arm in a state where the opening 20a of the article storage recess section 20 is closed.

The bridge portion 14 extends in a vehicle forward-rearward direction and connects a rear upper end section of the front block portion 12 to a front upper end section of the rear block portion 13 (article storage recess section 20). The bridge portion 14 is arranged above the article placement portion 11 to interpose a space portion 25. The width in the vehicle width direction of the bridge portion 14 is set to be narrower than the width in the vehicle width direction of the placement surface 11a of the article placement portion 11.

More specifically, a section to a rear end from a middle region in a forward-rearward direction of the bridge portion 14 is a narrow width section 14a in which the width in the vehicle width direction is sufficiently narrower than that of the placement surface 11a, and an end portion at both sides in the vehicle width direction is located at a further inward position than an end portion at both sides in the vehicle width direction of the placement surface 11a. A widened width section 14b in which the width in the vehicle width direction is gradually increased to a forward direction is provided on a front side of the narrow width section 14a of the bridge portion 14. A front end of the widened width section 14b is integrally connected to a rear section of the front block portion 12.

An outer edge in the width direction on a front end side of the widened width section 14b is joined to the eave section 22 described above of the front block portion 12.

Since in the narrow width section 14a of the bridge portion 14, the end portion at both sides in the vehicle width direction is located at a further inward position than the end portion at both sides in the vehicle width direction of the placement surface 11a, as shown in FIG. 2, when the center console 10 is seen from an upward direction, part of both side edges in the vehicle width direction of the placement surface 11a is seen to be exposed outward. Therefore, in a case where the portable information terminal is placed close to a side portion of the placement surface 11a such that a screen faces upward, it is possible to easily view the screen of the portable information terminal from an occupant seated in a seat (the driver seat or the passenger seat) at a side close to the placed portable information terminal. At this time, from an occupant seated in a seat (the passenger seat or the driver seat) at a side far from the placed portable information terminal, the bridge portion 14 (narrow width section 14a) becomes a blinder, and viewing of the screen of the portable information terminal is blocked. Accordingly, the screen of a portable information terminal which an occupant seated in one of the front seats places at a side close to the occupant is not seen by the next occupant, and it is possible to protect the privacy of each passenger in the front seats.

The terminal connection port 18 that is provided on each of the right and left inclination walls 17 at the front section of the article placement portion 11 is arranged at a position that does not overlap the bridge portion 14 in a top view. Further, the arrangement position of the terminal connection port 18 can be desirably a position that does not overlap the bridge portion 14 when seen from a visual line direction of the occupant seated in the front seat.

A variety of switches S such as a parking switch is arranged to be aligned in a forward-rearward direction on an upper surface of the bridge portion 14.

Figure 4:
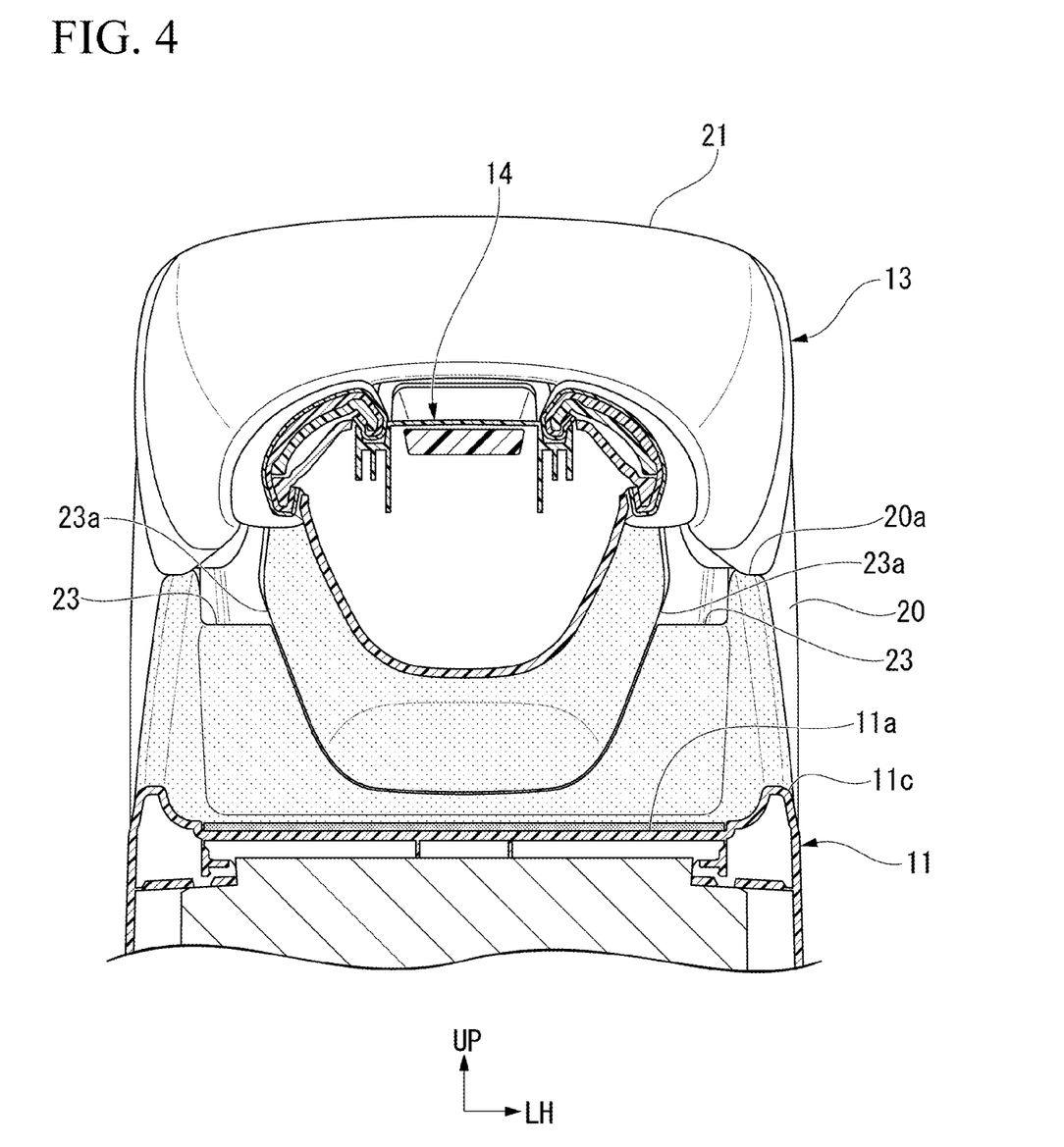
FIG. 4 is a cross-sectional view along a IV-IV line of FIG. 3.
Figure 5:
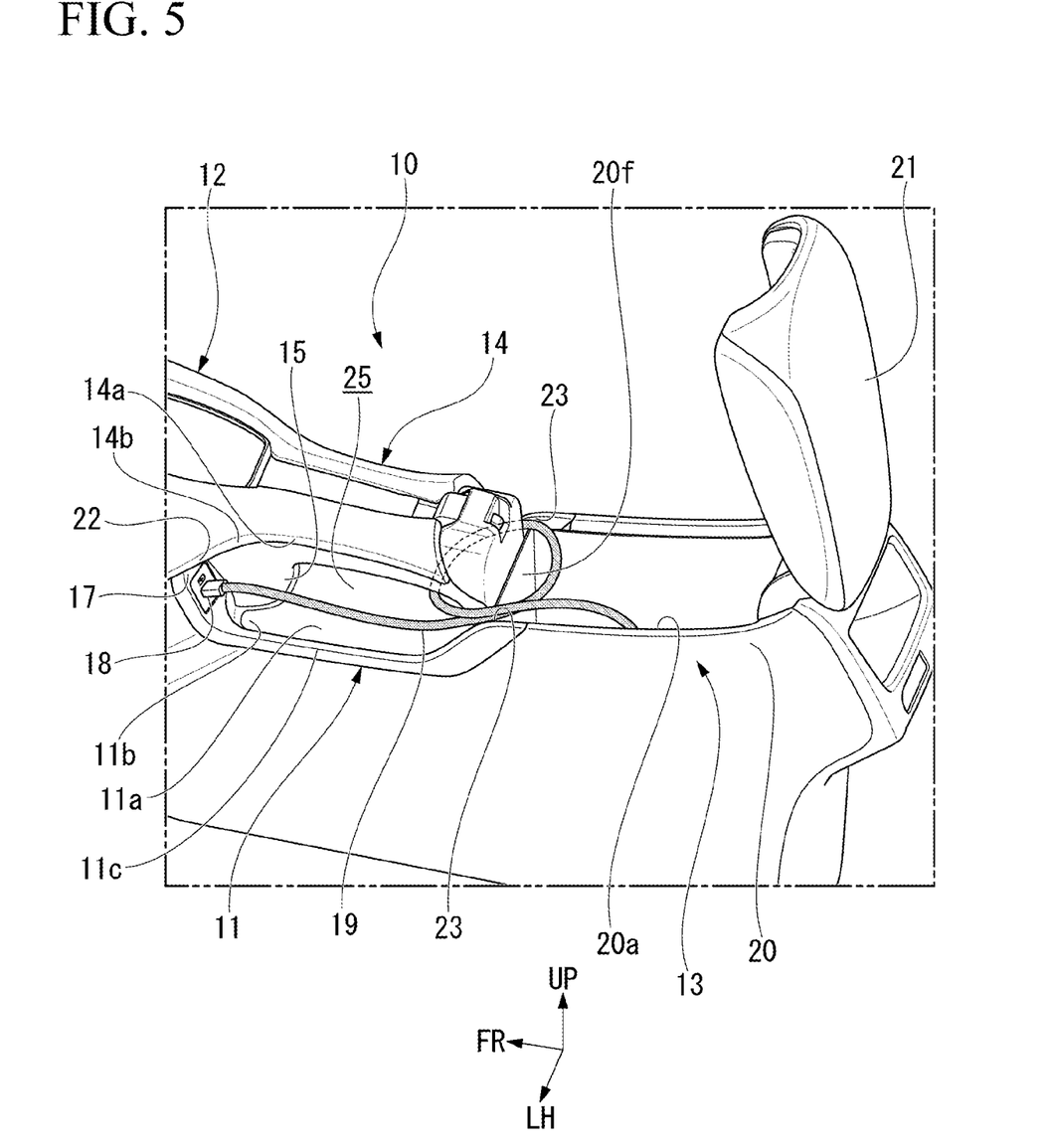
FIG. 5 is a perspective view of the center console according to the embodiment.

FIG. 4 is a cross-sectional view along a IV-IV line of FIG. 3. FIG. 5 is a perspective view of the center console 10 showing a state in which the lid body 21 of the rear block portion 13 is opened.

As shown in FIG. 4 and FIG. 5, a penetration groove 23 that opens upward and penetrates through a front wall 20f of the article storage recess section 20 in a forward-rearward direction is formed on two positions (circumferential wall) that are spaced from each other at both right and left sides of the front wall 20f. In each penetration groove 23, a cable 19 connected to the portable information terminal can be inserted from an upper side. An upper portion of the right and left penetration grooves 23 of the front wall 20f is closed by a front edge portion of the lid body 21 when an upper part of the article storage recess section 20 is closed by the lid body 21. In other words, the lid body 21 opens an upper portion of the two penetration grooves 23 in an open state, and covers an upper side of the two penetration grooves 23 and maintains communication between forward and rearward portions of the front wall 20f in a closed state.

As shown in FIG. 5, the center console 10 can hold the extra length portion of the cable 19 by the front wall 20f through the two penetration grooves 23 of the front wall 20f.

Specifically, in a state where the lid body 21 is opened, for example, the cable 19 is inserted from a front direction into one penetration groove 23 of the front wall 20f, and the cable 19 that is drawn into the article storage recess section 20 is arranged in a width direction at a rear surface side of the front wall 20f and is inserted into the other penetration groove 23. Then, the cable 19 that is drawn from the other penetration groove 23 to the forward side of the front wall 20f is arranged in the width direction at a front surface side of the front wall 20f and is inserted into the one penetration groove 23 again. Thereby, the extra length portion of the cable 19 is held between the two penetration grooves 23 of the front wall 20f. An end portion of the cable 19 having the extra length portion that is held by the front wall 20f can be placed, for example, inside the article storage recess section 20 together with the portable information terminal.

As shown in FIG. 4, an inclination portion 23a that is inclined outward in the width direction toward an upper side is provided on the right and left penetration grooves 23 of the front wall 20f in a lower region of an inner side surface in the width direction that faces the inside of the groove. The inclination portion 23a functions as a cable regulation portion that regulates positon displacement of the cable 19 toward an upper side when the cable 19 is wound on the front wall 20f across the right and left penetration grooves 23. Accordingly, by winding the cable 19 on the front wall 20f such that the cable 19 is in contact with the inclination portion 23a, the winding position of the cable 19 can be maintained at a constant position close to a lower portion of the front wall 20f. As a result, an electrical device such as a portable information terminal connected to the cable 19 can be stored in a stable state in the article storage recess section 20.

As described above, in the center console 10 of the present embodiment, the bridge portion 14 that is provided on the front block portion 12 and the rear block portion 13 is arranged above the article placement portion 11 to interpose the space portion 25. Therefore, a main section above the article placement portion 11 is covered by the bridge portion 14, and even in a case where an occupant accidentally spills a liquid such as a drink at the upper side of the center console 10, the liquid such as the drink is unlikely to be slopped on an article that is placed on the article placement portion 11.

Further, in the center console 10 of the present embodiment, the terminal connection port 18 is arranged on the inclination wall 17 at the front section of the article placement portion 11 and is located at a position that does not overlap the bridge portion 14 in the top view. Therefore, together with the narrower width of the bridge portion 14 than the width of the article placement portion 11, it is possible to easily attach and detach a terminal of an electrical device with respect to the terminal connection port 18.

Accordingly, in a case where the center console 10 of the present embodiment is employed, it is possible to protect an article that is placed on the article placement portion 11 by the bridge portion 14, and an occupant seated in the front seat can easily attach and detach the terminal of the electrical device with respect to the terminal connection port 18.

Further, in the center console 10 of the present embodiment, the inclination wall 17 on which the terminal connection port 18 is provided is inclined also in the vehicle width direction toward the direction of the occupant seated in the front seat at the front section of the article placement portion 11. Therefore, in a case where the present configuration is employed, the occupant seated in the front seat can easily connect the terminal of the cable 19 or the like to the terminal connection port 18 while accurately confirming the shape or the position of the terminal connection port 18 and keeping a seated state, and can easily remove the terminal from the terminal connection port 18.

Further, in the center console 10 of the present embodiment, the eave section 22 that extends above the terminal connection port 18 is provided on the front block portion 12. Therefore, an upper side of the terminal connection port 18 is covered by the eave section 22 of the front block portion 12, and thereby, when a liquid such as a drink is spilled at the upper side of the center console 10, it is possible to prevent the spilled liquid from being directly slopped on the terminal connection port 18 by the eave section 22.

Accordingly, in a case where the present configuration is employed, it is possible to reliably protect the terminal connection port 18 while maintaining a good attachment/detachment operation property of the terminal with respect to the terminal connection port 18.

In particular, in the present embodiment, a front end of the eave section 22 is inclined to a vehicle rearward side toward the inside in the width direction of the center console 10. Therefore, in a top view, the inclination directions (inclination directions relative to the forward-rearward direction) of the inclination of the front end of the eave section 22 and the inclination of the inclination wall 17 on which the terminal connection port 18 is provided become the same direction. Therefore, an operator's hand is unlikely to interfere with the eave section 22 at the time of an attachment/detachment work of the terminal with respect to the terminal connection port 18.

Accordingly, in a case where the present configuration is employed, an attachment/detachment work property of the terminal is improved.

Further, the center console 10 of the present embodiment includes the penetration groove 23 that penetrates through the circumferential wall of the article storage recess section 20 of the rear block portion 13, and the penetration groove 23 opens to an upper side of the article storage recess section 20. The cable 19 for connecting the terminal connection port 18 to an electrical device is capable of being inserted through the penetration groove 23 from the upper side. Therefore, by inserting the cable 19 of which one end portion is connected to the terminal connection port 18 through the penetration groove 23, an electrical device that is connected to the other end portion of the cable 19 can be arranged in the article storage recess section 20 of the rear block portion 13.

Accordingly, in a case where the present configuration is employed, the placement position of the electrical device connected to the terminal connection port 18 by the cable 19 can be selected from the article placement portion 11 and the article storage recess section 20 and be determined. Therefore, since it is possible to select the placement position of the electrical device in accordance with the preference or the purpose of use of the occupant, the convenience for the user is further enhanced.

Further, in the center console 10 of the present embodiment, the penetration groove 23 is provided on each of both right and left sides of the front wall 20f of the article storage recess section 20. Therefore, the cable 19 for connecting the terminal connection port 18 to the electrical device can be wound around the front wall 20f of the article storage recess section 20 through the right and left penetration grooves 23.

Accordingly, in a case where the present configuration is employed, when the length of the cable 19 to be used is long, the extra length portion of the cable 19 can be held between the right and left penetration grooves 23 of the front wall 20f of the article storage recess section 20, and it is possible to enhance the convenience for the user.

Further, in the present configuration, since the penetration groove 23 is provided on each of both right and left sides of the front wall 20f, even when the terminals of the cables 19 are connected to the right and left terminal connection ports 20, respectively, by inserting each cable 19 through a corresponding penetration groove 23 of the right and left penetration grooves 23, electrical devices each connected to each cable 19 can be simultaneously accommodated in the article storage recess section 20.

Further, in the center console 10 of the present embodiment, the lid body 21 that is openable and closable and that closes the upper part of the article storage recess section 20 is provided on the rear block portion 13, the lid body 21 opens an upper part of each penetration groove 23 when the lid body 21 is in an open state, and the lid body 21 covers the upper part of each penetration groove 23 and maintains communication in a forward-rearward direction of the front wall 20f when the lid body 21 is in a closed state. Therefore, an electrical device can be stored in the article storage recess section 20 while maintaining a state where the electrical device and the terminal connection port 18 are connected by the cable 19, and the lid body 21 can be closed while maintaining the state. Therefore, the electrical device can be stored in the storage recess section 20 in a state where the electrical device cannot be seen from the outside and charging of the electrical device or the like can be performed in the state.

Accordingly, in a case where the present configuration is used, the electrical device can be further safely arranged inside the vehicle.

Further, in the case of the present configuration, when the lid body 21 is in a closed state, since the lid body 21 covers the upper part of the penetration groove 23 formed on the front wall 20f, the penetration groove 23 is unlikely to be seen from the outside, and the appearance from the outside is improved.

The present invention is not limited to the embodiment described above, and various design changes can be made without departing from the scope of the invention.

For example, the above embodiment is described using an example in which two penetration grooves 23 that allow insertion of the cable 19 are formed on the front wall 20f of the article storage recess section 20; however, the number of penetration grooves 23 may be one or may be equal to or more than three.

Further, the formation position of the penetration groove 23 is not limited to the front wall 20f of the article storage recess section 20. The penetration groove 23 may be formed on a side wall or the like of the circumferential wall of the article storage recess section 20 other than the front wall 20f.

However, in a case where the penetration groove 23 is formed on the front wall 20f as in the embodiment described above, the arrangement of the cable 19 is smoothly performed, the cable 19 is unlikely to be seen from the outside, and the appearance from the outside is improved.

What is claimed is:

1. A vehicle center console comprising:
an article placement portion;
a front block portion that is arranged at a forward position of the article placement portion;
a rear block portion that is arranged at a rearward position of the article placement portion;
a bridge portion that is provided on the front block portion and the rear block portion, is arranged above the article placement portion to interpose a space portion, and has a width in a vehicle width direction which is narrower than that of the article placement portion;
an inclination wall that is arranged on a front section of the article placement portion and is inclined to a vehicle forward side toward an upward direction; and
a terminal connection port that is arranged on the inclination wall,
wherein the terminal connection port is arranged at a position that does not overlap the bridge portion in a top view.

2. The vehicle center console according to claim 1, wherein the inclination wall is inclined in a vehicle width direction toward a direction of an occupant seated in a front seat.

3. The vehicle center console according to claim 1, wherein an eave section that extends above the terminal connection port is provided on the front block portion.

4. The vehicle center console according to claim 1, wherein an article storage recess section that opens upward is provided on the rear block portion, and
a penetration groove which opens to an upward side and through which a cable that connects the terminal connection port to an electrical device is capable of being inserted is provided on a circumferential wall of the article storage recess section.

5. The vehicle center console according to claim 4, wherein the penetration groove is provided on both right and left sides of a front wall of the article storage recess section.

6. The vehicle center console according to claim 5, wherein a lid body that is openable and closable and that closes an upper part of the article storage recess section is provided on the rear block portion, and
the lid body opens an upper part of the penetration groove in an open state and covers the upper part of the penetration groove and maintains communication in a forward-rearward direction of the front wall in a closed state.

7. The vehicle center console according to claim 2, wherein an eave section that extends above the terminal connection port is provided on the front block portion.

* * * * *